May 29, 1934.   L. STOLTENBERG   1,960,857
POTATO HARVESTING APPARATUS
Original Filed March 14, 1928   3 Sheets-Sheet 1
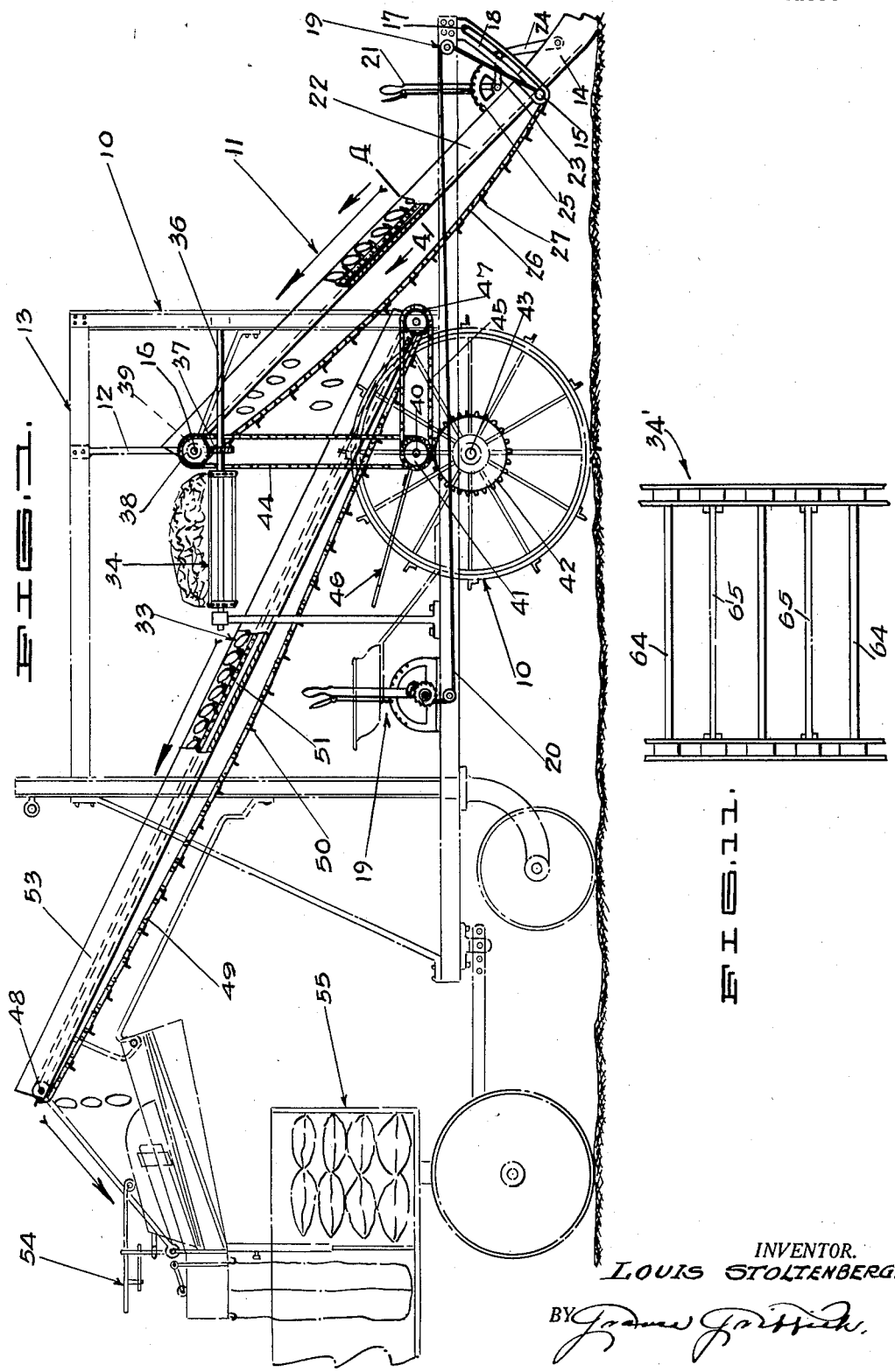
INVENTOR.
LOUIS STOLTENBERG.
BY
ATTORNEY.

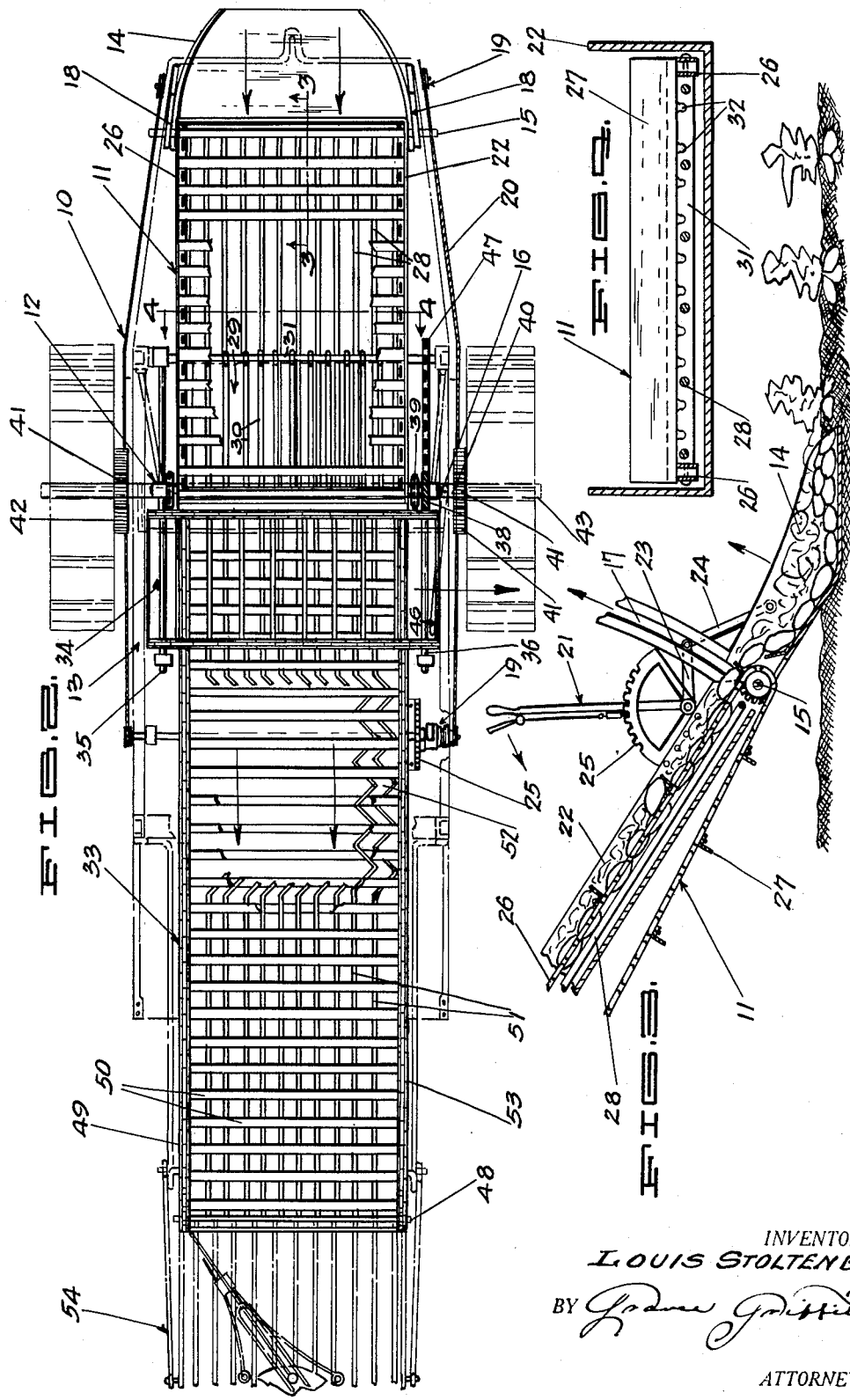

May 29, 1934.  L. STOLTENBERG  1,960,857
POTATO HARVESTING APPARATUS
Original Filed March 14, 1928  3 Sheets-Sheet 3
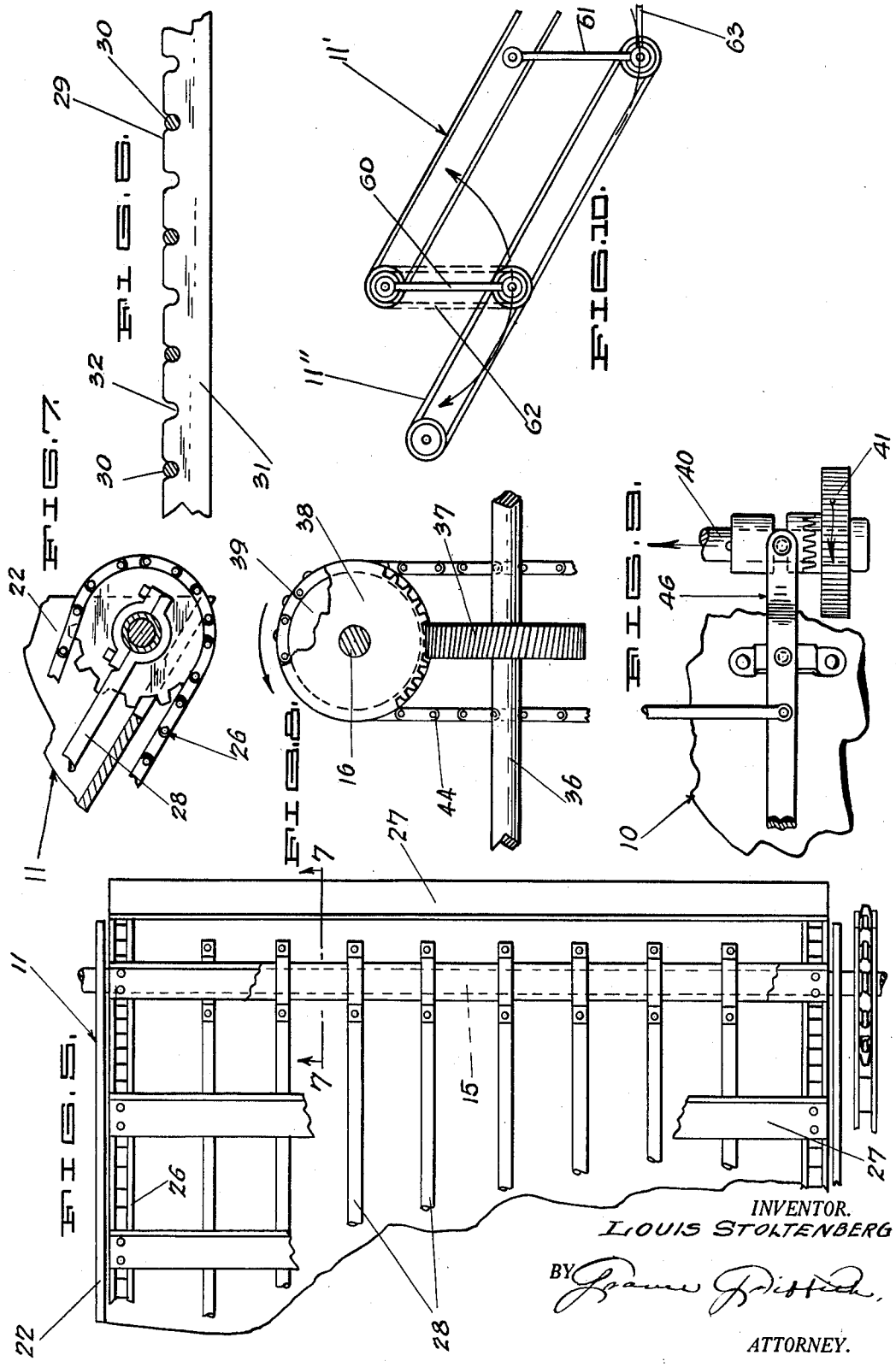
INVENTOR.
LOUIS STOLTENBERG
BY
ATTORNEY.

Patented May 29, 1934

1,960,857

UNITED STATES PATENT OFFICE 1,960,857

POTATO HARVESTING APPARATUS

Louis Stoltenberg, Oakland, Calif.

Original application March 14, 1928, Serial No. 261,442. Divided and this application February 4, 1929, Serial No. 337,254

1 Claim. (Cl. 209—324)

The present invention relates broadly to improvements in potato harvesters, and embodies various improvements in design and construction over that shown and described in my Patent No. 1,487,821, issued March the 25th, 1924, for Potato picking machines, and is a divisional application of my co-pending application, Serial No. 261,442, filed March the 14th, 1928.

The primary object of the invention is the provision of an improved conveying means adapted to assist in the assortment of the potatoes as to size and to also sift the dirt and other débris therefrom in their rearward passage from the plow.

Other objects and advantages of the invention will appear as this specification progresses, and be more fully set forth in the claim hereto appended.

In the accompanying drawings, forming a part of this specification, and in which similar characters of reference refer to like parts, throughout:

Figure 1 is a side elevation, showing a completely assembled apparatus as it would appear in readiness for use;

Figure 2 is a plan view of the same, showing portions of the conveyor broken away to permit of greater clearness of illustration;

Figure 3 is an enlarged sectional detail of the plow and the lower end of the forward conveyor as it appears in position for operation, the section being indicated by the line 3—3, in Figure 2;

Figure 4 is a transverse section taken through the forward conveyor, the section being indicated by the line 4—4, in Figures 1 and 2;

Figure 5 is an enlarged plan detail of the lower end of the forward swingable conveyor and is illustrative of the constructional details thereof;

Figure 6 is a detailed view illustrating the adjustable rods carried by the upper end of the forward conveyor and through which the potatoes drop to the lower end of the rear, or lower, conveyor;

Figure 7 is a sectional detail, showing the assembly of the conveyor drive shafts and connecting-rod bearings, the section being indicated by the lines 7—7, in Figure 5;

Figure 8 is an enlarged detail illustrative of the vine-separator driving mechanism;

Figure 9 is a view in detail, showing the clutch mechanism employed in disconnecting the main and conveyor drives;

Figure 10 is a modified form of conveyor, showing an adjustable end conveyor adapted for swinging adjustment relative to the first conveyor; and Figure 11 is a somewhat modified form of separator conveyor.

Referring to the drawings with greater particularity, the numeral 10 designates, in a general way, the supporting structure, including frame and wheels, the structure being adapted for connection to any suitable power unit, such as a tractor, (not shown).

The forward conveyor 11 is swingably mounted at its upper end in bearing-supports 12 carried by the superstructure 13 of the apparatus and is angularly disposed relative to the ground, as shown in Figure 1, with its lower end terminating short of the ground level, and provided at this end with an adjustable plowshare 14 so arranged as to permit of its being swung about the lower shaft 15 thereof, the upper shaft 16 being rotatably secured to the bearings 12.

The shaft 15 of the conveyor extends into arcuate guide-slots 17 carried by arcuately disposed braces 18 positioned upon opposite sides of the frame and embracing the lower end of the conveyor, the slots conforming to an arc struck from the center of the shaft 16 in manner permitting the swinging of the lower end of the conveyor to cause the plow 14 to be raised to clear the ground when being transferred from place to place, this operation being accomplished through the action of hand-lever and ratchet-drum mechanism 19 upon a cable 20 having an end connection with the shaft 15 and adaptable for movement in either direction.

The plow 14 is scoop-shaped, as shown in Figures 1, 2 and 3, and mounted to be raised and lowered, relative to the conveyor shaft 15, by means of a lever 21 carried by the lower end of the conveyor chute 22 and connected with the plow by means of a rigid arm 23 and a link 24, an arrangement permitting its adjustment to any desired cutting or scooping angle and held rigidly to this position by means of the sector 25.

The conveyor 11 comprises the chute 22, the shafts 15 and 16, the spaced side-chains 26, the cross-plates 27, and the longitudinal rods 28. The rods 28 are properly spaced apart to prevent the potatoes from dropping through but are sufficiently close to allow loose earthy particles to be sifted from the potatoes as they are borne upwardly by the cross-pieces 27 of the conveyor. The weight of the chains 26 and cross-piece 27 is carried by the rods 28 and the cross-pieces slide thereon in their movement toward the upper end of the conveyor, the potatoes being slidably borne along these rods in advance of the cross-pieces.

The upper end of the conveyor 11 is provided with a separate section 29 consisting of a plurality of removable rods 30 carried by cross-pieces 31, as shown in Figures 2 and 3, these rods being retained in place by notches 32 adapted for their reception and permitting their adjustment laterally to vary their spacing apart to accommodate the passage therebetween of differently sized potatoes to the lower conveyor 33, the vines and similar débris being carried up and over the end of the conveyor and discharged upon the vine separator 34.

The vine separator and carrier 34 receives the vines and other débris that may not have been disposed of by the conveyor 11 in its travel to this point, together with such potatoes as may still adhere to the vines, and carries these crosswise of the travel of the conveyor, this action serving to detach the remaining potatoes from the vines, these dropping to the conveyor 33, while the vines and other matter are borne transversely and discharged to one side as refuse.

The separator 34 consists of an ordinary link conveyor having wide spaces between the links and mounted upon shafts 35 and 36 carried by the supporting frame. The shaft 36 carries a helical gear 37 meshing with a like gear 38 carried by the conveyor shaft 16, this shaft and the separator shaft 36 being driven by a sprocket wheel 39 also mounted upon the shaft 16, Figure 8.

The lower, or rear, conveyor 33, the forward conveyor 11, and the separator 34 are driven by a shaft 40 mounted upon the platform of the apparatus and having a pinion 41 mounted on opposite ends thereof and meshing with gears 42 carried by the axle 43, the conveyor 11 being connected to the shaft 40 by means of chains and sprockets 44, and the conveyor 33 thereto by means of chains and sprockets 45.

The clutch mechanism 46, Figures 1 and 9, is mounted upon the shaft 40, and operates to cause the disengagement of pinions 41 from the driving gears 42 to stop the actuation of the conveyor while transferring the apparatus from one field of operation to another, or when it is desired that the conveyors remain inactive.

The rear conveyor 33 consists of a lower shaft 47 mounted in bearings carried by the frame and an outer shaft 48, the chains 49 thereof being of ordinary construction and provided with spaced cross-pieces 50 similar to those of the conveyor 11. The longitudinally disposed rods 51 of this conveyor are arranged similarly to those of the conveyor 11, except in that they are provided with wavy sections 52 over which the potatoes in their rearward travel are compelled to pursue an irregular course calculated to free them of whatever vines or other débris that may be still clinging to them. This rear conveyor is further provided with a chute 53 adapted to prevent the potatoes from falling off the conveyor while being carried rearwardly. This conveyor is inclined rearwardly with its outer end projecting somewhat beyond the end of the frame of the apparatus for the accommodation of a sorting and sacking attachment 54, shown in Figures 1 and 2 in dot-and-dash lines and forming the subject matter of a co-pending application.

To meet requirements, when this attachment is desired to be employed, the rear end of the conveyor 33 is sufficiently raised to permit of the coupling-on to the apparatus of a trailer 55, as a means for handling expeditiously the potatoes as sacked.

Obviously, though designed particularly for potato harvesting, there are divers other applications wherein the apparatus would prove equally valuable, as, for instance, in the harvesting of beets, turnips, and like products.

Briefly, in operation, the conveyor 11 would be dropped into the position shown in Figure 1, the lever 21 manipulated for the adjustment of the plow 14 for the required digging depth, and the machine drawn over the ground to be dug by means of any power adapted to meet requirements. Once in motion, the potatoes, together with such other matter as may adhere thereto, are plowed, or rather, scooped, up by the plow 14 and cast upon the adjacent, or forward, end of the conveyor 11, to be thence carried rearwardly and upwardly by this conveyor until the section 29 is reached, at which point the potatoes are received by the rods 30, these rods being sufficiently spaced apart to permit the potatoes to drop through and be received by the lower conveyor 33, the vines, débris, and such potatoes as may be still clinging to the vines being passed on and thrown upon the transverse carrier and vine separator 34, where, through the peculiar cross action of this carrier, the remaining potatoes are removed and the vines and coarser débris conveyed to the side for disposal.

In the modified form of conveyor shown in Figure 10, the conveyor 11' is provided with a swingable extension conveyor 11'' swung into place by the arms 60 and 61 and driven through the chain connection 62 connected to the main conveyor sprocket, as shown, the object of this extension conveyor 11'' being to provide means wherethrough the main conveyor 11' may be lengthened or shortened, as desired, the conveyor 11'' being adjusted relative to the main conveyor by any suitable link connection 63 connected to any adaptable adjusting member, such as a lever, not shown.

The conveyor, or vine separator, shown in Figure 11, is a modified form of the separator 34, and comprises the usual chain conveyor 34' provided with fixed tie rods 64 and intermediate removal tie rods 65, the removable rods 65 being utilized to shorten the spaces between the usual rods 64, for the purpose of adjusting the conveyor to meet the requirements of varying sized potatoes.

Having thus described my invention, I claim, and desire to secure by Letters Patent:

In a potato harvesting apparatus, a receiving conveyor, a separating conveyor associated with said receiving conveyor, means on said separating conveyor for removing débris clinging to the potatoes carried thereby, said means comprising closely adjacent longitudinal rods arranged in parallel, tortuous formation whereby the débris will be scraped from the potatoes while travelling over the separating conveyor.

LOUIS STOLTENBERG.